United States Patent
Maalouli et al.

(10) Patent No.: US 9,239,372 B2
(45) Date of Patent: Jan. 19, 2016

(54) EXTRACTING SPECTRAL FEATURES FROM A SIGNAL IN A MULTIPLICATIVE AND ADDITIVE NOISE ENVIRONMENT

(75) Inventors: Ghassan C. Maalouli, Scottsdale, AZ (US); Brett J. Young, Tucson, AZ (US)

(73) Assignee: Raytheon Company, Waltham, MA (US)

(*) Notice: Subject to any disclaimer, the term of this patent is extended or adjusted under 35 U.S.C. 154(b) by 438 days.

(21) Appl. No.: 13/613,870

(22) Filed: Sep. 13, 2012

(65) Prior Publication Data

US 2014/0070983 A1    Mar. 13, 2014

(51) Int. Cl.
  G01S 7/41   (2006.01)
  G01S 13/02  (2006.01)
  G01S 7/40   (2006.01)

(52) U.S. Cl.
  CPC ............... *G01S 7/414* (2013.01); *G01S 7/4004* (2013.01); *G01S 7/41* (2013.01); *G01S 13/02* (2013.01)

(58) Field of Classification Search
  CPC ....... G01S 7/2813; G01S 7/414; G01S 7/418; G01S 7/41–7/411
  USPC ......................................................... 342/192
  See application file for complete search history.

(56) References Cited

U.S. PATENT DOCUMENTS

| | | |
|---|---|---|
| 5,105,195 A | 4/1992 | Conrad |
| 5,748,670 A | 5/1998 | Zastrow |
| 5,872,538 A | 2/1999 | Fowler |
| 7,079,072 B1 | 7/2006 | Abatzoglou |

FOREIGN PATENT DOCUMENTS

WO    9801770 A1    1/1998

*Primary Examiner* — Matthew M Barker
(74) *Attorney, Agent, or Firm* — Burns & Levinson LLP; Joseph M. Maraia

(57) ABSTRACT

A spectral feature extracting engine, chirp detecting engine, and target classifying engine with corresponding method, system, and computer product are provided. Given a "noisy" signal having multiplicative and additive noise, the spectral feature extracting engine extracts spectral features from the noisy signal in the form of a spectral detection density. The extraction includes identifying an initial detection by comparing the spectral content of a subject time-frequency slice with an initial detection threshold calculated from a set of time-frequency slices, and determining the spectral detection density as a function of a number of identified initial detections and number of compared time-frequency slices. Based on the spectral detection density of the noisy signal, the chirp detecting engine detects multiple channel-induced and target-induced chirps present in the noisy signal and the target classifying engine classifies a target from the noisy signal.

12 Claims, 11 Drawing Sheets

Spectral Feature Extracting Engine

Chirp Detecting (Estimating, and Demodulating) Engine

Target Classifying Engine

EXTRACTING SPECTRAL FEATURES FROM A SIGNAL IN A MULTIPLICATIVE AND ADDITIVE NOISE ENVIRONMENT

GOVERNMENT SUPPORT

This disclosure was made with government support under N00024-07-C-5437 awarded by the Phalanx CIWS Engineering & Technical Services. The government has certain rights in the disclosure.

BACKGROUND

A chirp is characterized by a frequency that is swept across a spectrum. The sweep can be of a first or higher order. When it is of the first order, the signal is a linear chirp. If it is second order, then the signal is a quadratic chirp and so on. Chirps do not lend themselves to analysis via classical Fourier transform techniques like the fast Fourier transform (FFT). The FFT is a proper tool to analyze signals with invariant or slowly varying frequencies over an observation interval. Analyzing signals with time-varying frequencies, however, requires a different set of tools.

A Short-Time Fourier Transform (STFT) is well suited and widely used for analyzing signals with time-varying frequencies. Even with STFT, however, analyzing a time-frequency spectrum like that of FIG. 5 for a chirp or for spectral features indicative of a chirp is arduous. What may be visually obvious, however, is not as easily attained algorithmically. Beside the fact that a chirp detecting algorithm has to perform a two-dimensional search of the entire spectrum, the algorithm has to make decisions as to what is a chirp or what is indicative of a chirp on a large number of pixels (i.e., spectral information or data). It seems advantageous to analyze a signal in a transform domain where a chirp is a localized signal rather than one that is distributed across the entire spectrum.

Academic work in the signal processing has produced several algorithms that are designed to detect or estimate chirps in a localized manner. The work includes a maximum likelihood technique, Discrete Chirp Fourier transform, and the cubic phase transform. These techniques, however, are limited to signals having a single chirp present, and a noise model that is additive and Gaussian in nature. These techniques are inadequate for detecting or estimating chirps in signals containing multiple chirps and having noise that is multiplicative in nature.

Particularly challenging is the presence of broadband noise that can clutter the entire spectrum. By comparison, a chirp occupies a finite region across frequency. Broadband noise has a spectral signature that spreads energy across the entire spectrum. This type of noise may be uniform across frequency but its time spread extends for the duration of the noise burst in the time domain signal.

SUMMARY

Described herein are techniques and devices for processing a signal. In particular, one or more spectral features are extracted from a signal and used to detect channel-induced and target-induced chirps in the signal or to classify a target based on the spectral features of the signal.

In some aspects, this disclosure provides a process for detecting channel-induced and target-induced chirps in a signal or for classifying a target from a signal using spectral feature extraction. The process includes, given a signal having impairments including multiplicative and additive noise (i.e., "noisy" signal), removing direct current bias from the signal producing a bias-free signal. The process includes transforming the bias-free signal into a time-frequency spectrum. The process includes slicing the time-frequency spectrum across time into time-frequency slices, each of the time-frequency slices having spectral content representing a measure of power spectral density of the bias-free signal at a given point in time. The process includes computing an initial detection threshold associated with the given signal from the time-frequency slices. The process includes for at least some (or for each) of the time-frequency slices comparing the spectral content of a subject time-frequency slice with the computed initial detection threshold to identify an initial detection. The process includes determining a spectral detection density as a function of a number of initial detections being identified and number of time-frequency slices being compared. The process includes detecting channel-induced and target-induced chirp(s) present in the given signal based on the determined spectral detection density or in a target classifying engine, classifying a target from the given signal based on the determined spectral detection density.

In some aspects, this disclosure provides a system including a spectral feature extracting engine and a chirp detecting engine or target classifying engine communicatively coupled to the spectral feature extracting engine. The spectral feature extracting engine is configured to perform the operations of, given a signal having impairments including multiplicative and additive noise, removing direct current bias from the signal producing a bias-free signal and transforming the bias-free signal into a time-frequency spectrum. The spectral feature extracting engine is configured to also perform the operations of slicing the time-frequency spectrum across time into time-frequency slices, wherein each of the time-frequency slices has spectral content representing a measure of power spectral density of the bias-free signal at a given point in time, and computing an initial detection threshold associated with the given signal from the time-frequency slices. The spectral feature extracting engine is configured to also perform the operations of, for at least some (or for each) of the time-frequency slices, comparing the spectral content of a subject time-frequency slice with the computed initial detection threshold to identify an initial detection, and determining a spectral detection density as a function of a number of initial detections being identified and number of time-frequency slices being compared.

The chirp detecting engine is configured to perform the operation of detecting channel-induced and target-induced chirp(s) present in the given signal based on the determined spectral detection density.

The target classifying engine is configured to perform the operation of classifying a target from the given signal based on the determined spectral detection density.

In some aspects, this disclosure provides a computer-readable storage medium encoded with instructions that when executed by a data processing apparatus, cause the data processing apparatus to, given a signal having impairments including multiplicative and additive noise, remove direct current bias from the signal producing a bias-free signal and transform the bias-free signal into a time-frequency spectrum. The data processing apparatus is also caused to, slice the time-frequency spectrum across time into time-frequency slices, wherein each of the time-frequency slices has spectral content representing a measure of power spectral density of the bias-free signal at a given point in time, and compute an initial detection threshold associated with the given signal from the time-frequency slices. The data processing apparatus is also caused to, for at least some (or for each) of the time-frequency slices, compare the spectral content of a subject time-frequency slice with the computed initial detection threshold to identify an initial detection, and determine a spectral detection density as a function of a number of initial detections being identified and number of time-frequency slices being compared.

The data processing apparatus is also caused to either detect channel-induced and target-induced chirp(s) present in the given signal based on the determined spectral detection density, or classify a target from the given signal based on the determined spectral detection density.

In other examples, any of the aspects above can include one or more of the following features.

In some examples, transforming the bias-free signal includes using any one of Short-Time Fourier Transform, Wignerville Transform, and derivatives thereof to transform the given signal.

In other examples, computing the initial detection threshold includes computing any order moment, or derivatives thereof, of the spectral content of the time-frequency slices measured in power, log-power, magnitude, or combinations thereof.

In some examples, comparing includes identifying the initial detection when the spectral content of the subject time-frequency slice exceeds the computed initial detection threshold.

In other examples, determining the spectral detection density includes scaling the number of initial detections being identified by a time-bandwidth product of a given number of time-frequency slices.

In some examples, detecting channel-induced and target-induced chirp(s) includes comparing the spectral detection density to a threshold indicative of chirp being present.

In other examples, classifying the target includes comparing the determined spectral detection density with spectral signatures obtained from training data.

In other examples, classifying the target includes comparing the determined spectral detection density over time with spectral signatures obtained from training data.

In some examples, the process further includes given one or more chirps detected based on the spectral detection density of the given signal, associating initial detections occurring over a given span of time together, and curve fitting the associated initial detections to determine one or more chirp estimates.

In other examples, the process further includes given one or more chirps detected based on the spectral detection density of the given signal and given one or more determined chirp estimates, demodulating the one or more detected chirps from the given signal using the chirp estimates.

The techniques and devices, or "technology," described herein for extracting spectral features from a noisy signal for chirp detection or for target classification can provide one or more the following advantages. Advantageously, the technology can process signals having multiple chirps with multiplicative and additive noise. As another advantage, the technology can process a greater variety of signals (or signals having a greater variety of noise), and can be used in a greater number of military and civilian applications, such as target detection, classification, tracking, and channel estimation in wireless communications. In the latter, the foregoing technology can be used to estimate chirps in a channel and demodulate them from a received signal, which is otherwise unintelligible. As yet another advantage, the technology can process signals having multiplicative and additive noise without a separate process to remove or otherwise compensate for the noise. In turn, the technology eliminates from signal processing devices, for example, components that remove or otherwise compensate for multiplicative and additive noise, leading to savings in cost, energy consumption and size just to name a few.

DESCRIPTION

As an overview, examples of a process and system for extracting one or more spectral features from a signal for chirp detection or for target classification includes a spectral feature extracting engine, chirp detecting engine, and target classifying engine. In operation, the spectral feature extracting engine extracts one or more spectral features from a "noisy" signal having impairments, such as multiplicative and additive noise. The spectral features are extracted from the noisy signal in the form of a spectral detection density. In some arrangements, the chirp detecting engine detects chirp(s) in the noisy signal based on the spectral detection density. In other arrangements, the target classifying engine classifies a target from the noisy signal based on the spectral detection density.

Figure 1:
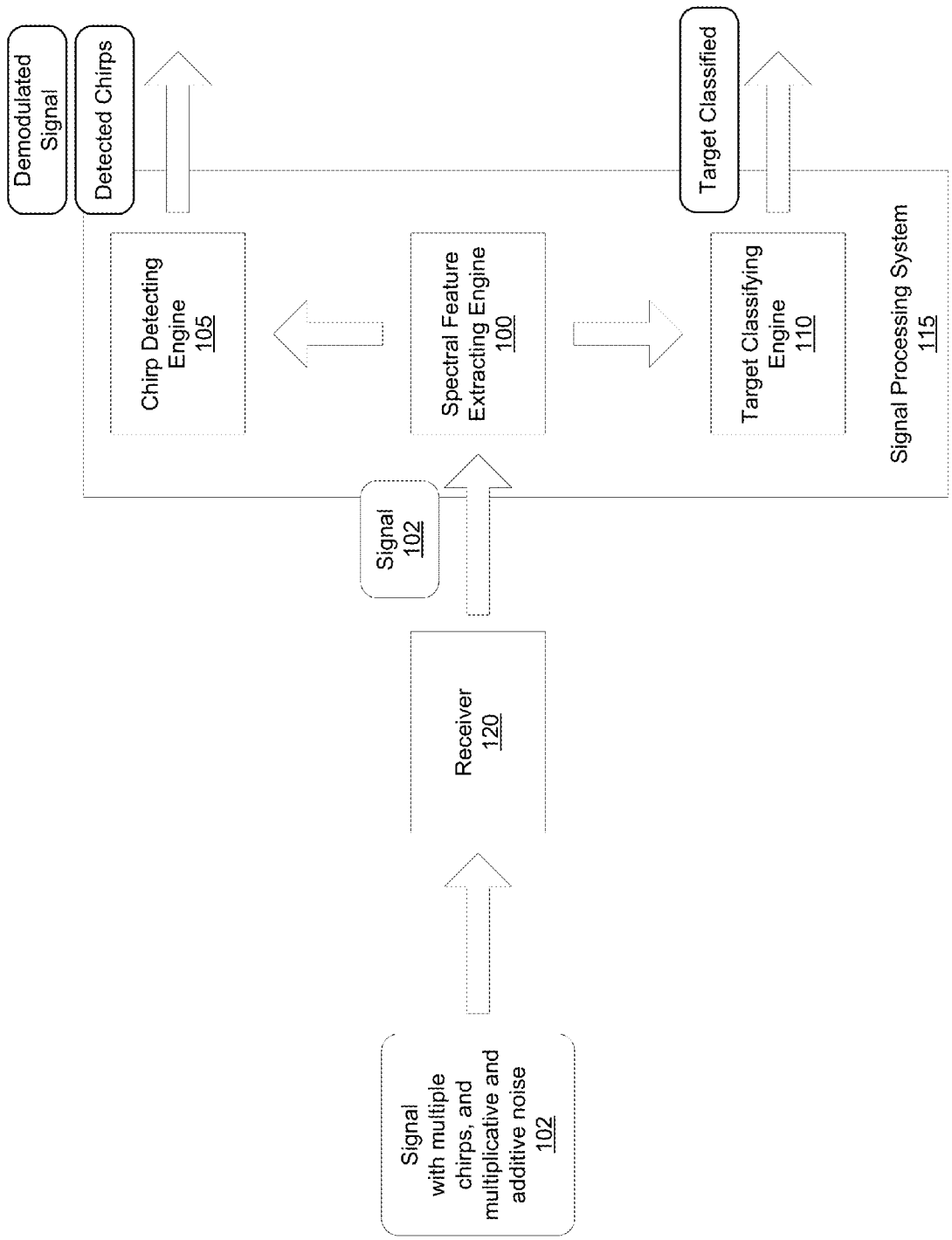
FIG. 1 is a block diagram of an example signal processing scenario in which examples of a spectral feature extracting engine, chirp detecting engine, and target classifying engine may be used.

According to some examples, FIG. 1 illustrates a spectral feature extracting engine 100, which may generally be used to extract one or more spectral features from a signal in the form of a spectral detection density. A chirp detecting engine 105 may then use the spectral detection density to detect chirp(s) in the signal. A target classifying engine 110 may then use the spectral detection density to classify a target from the signal. A signal processing system 115 may incorporate the spectral feature extracting engine 100, chirp detecting engine 105 and/or target classifying engine 110. The signal processing system 115, in turn, is coupled to a receiver 120 (e.g., radar or other system suitable for capturing signals). In some examples, the receiver 120 may be configured to capture one or more signals 125, such radar or "Doppler" return signals and communication signals.

Figure 4:
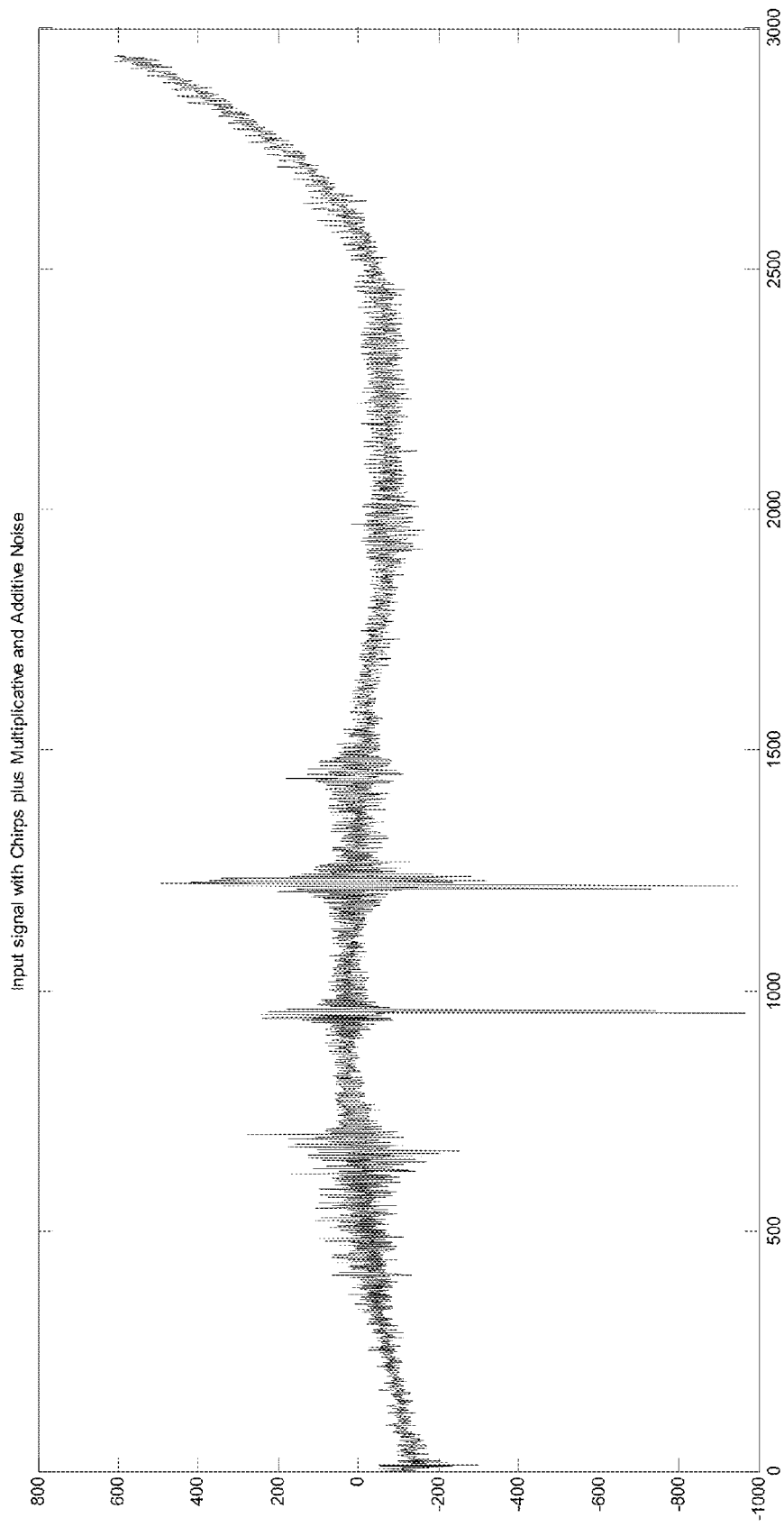
FIGS. 4-9 are graphical representations of an input signal, time-frequency spectrum, initial detection threshold, initial detection(s), detected chirps, and chirp estimates, respectively.

The signal 102 is one that is either generated by a target return, which is illuminated by a RADAR, or one that is received by a communications receiver after the signal 102 has been processed through a channel that contains one or more reflectors, which could be in motion. The signal 102 contains several impairments that manifest themselves in the form of composite chirps and multiplicative broadband noise FIG. 4 shows a graphical representation of an example of the signal 102. As shown, the signal 102 includes multiple chirps with multiplicative and additive noise.

Figure 2:
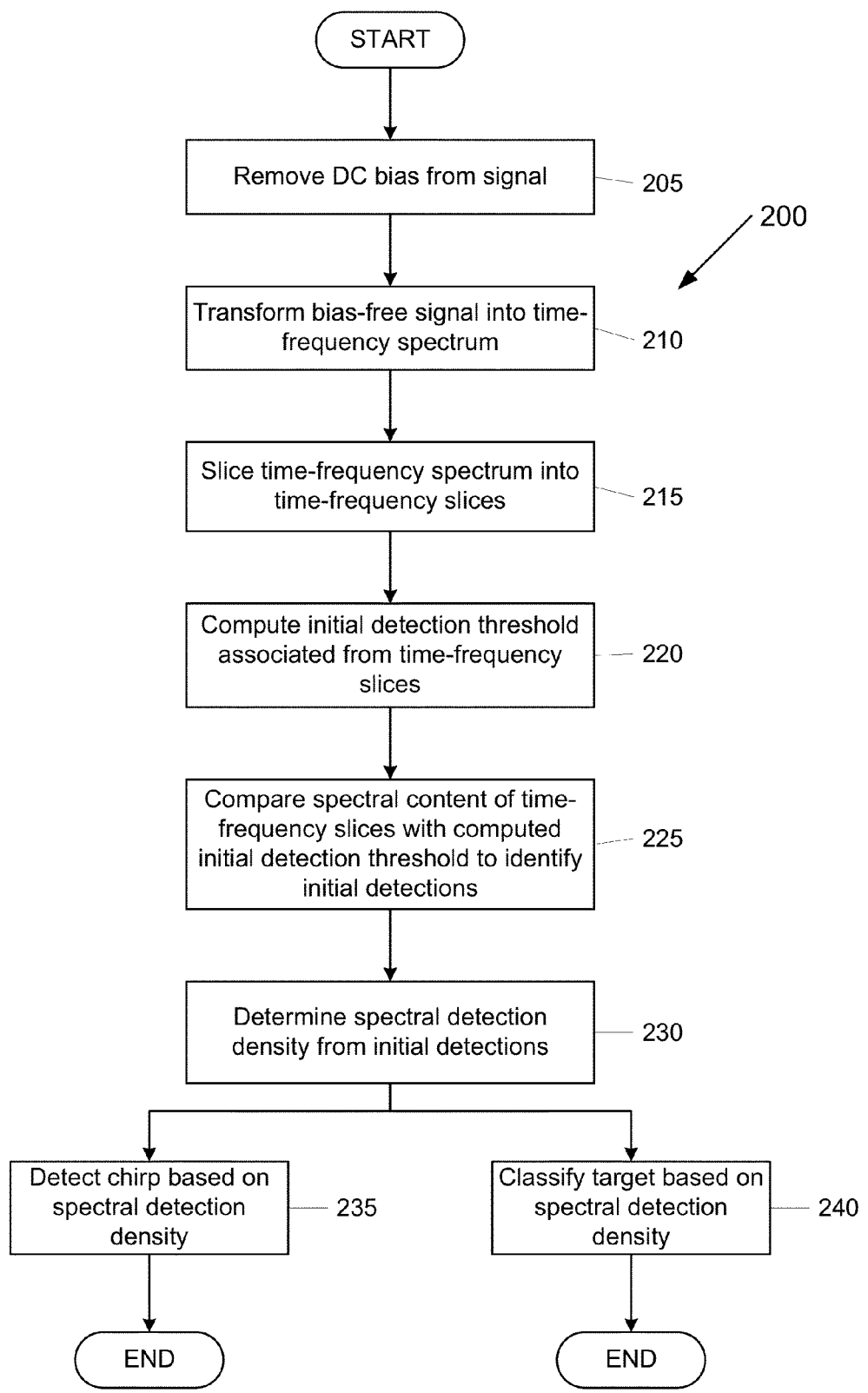
FIG. 2 is a flowchart of an example procedure for extracting a spectral feature from a signal for use in detecting chirp in the signal or classifying a target from the signal.

FIG. 2 shows an example spectral feature extracting procedure 200 using, for example, the spectral feature extracting engine 100 of FIG. 1. It will be understood and appreciated that procedure 200 need not be performed in the particular order illustrated in FIG. 2 and described in further detail herein, but rather may be performed in any suitable order that can result in a spectral detection density for use in detecting chirps in a signal and classifying a target from a signal.

The spectral feature extracting engine 100 is provided with a signal having impairments including multiplicative and additive noise. The spectral feature extracting engine 100 then removes (205) direct current (DC) bias from the signal to produce a substantially bias-free signal. In some examples, the spectral feature extracting engine 100 removes (205) the DC bias by estimating the mean of the signal using a sample mean computation and then subtracting the estimated mean from the signal.

The spectral feature extracting engine 100 transforms (210) the bias-free signal into a time-frequency spectrum. In some examples, the spectral feature extracting engine 100 uses a Short-Time Fourier Transform (STFT). STFT is well suited for analyzing signals with time-varying frequencies, such as the signals of interest in the present disclosure. STFT differs from the standard Fourier Transform (FT), which is not capable to extracting spectral features of a time-varying signal.

STFT includes a windowing function that defines a duration of a segment in time of a signal being analyzed. Once a segment is processed, the window is shifted by a time increment (i.e., across time or across the time axis) and the process is repeated until the entire record is analyzed. The output of the STFT is a two dimensional time-frequency record or spectrum in which the "rows" represent frequencies while the "columns" represent "samples" across time. Each of the samples is a FT from each time increment, which occupies a slice, called a "time-frequency-slice," in the frequency plane corresponding to a time that the FT is processed. In other examples, the spectral feature extracting engine 100 transforms (210) the signal using other transformations, such as Wignerville Transform, and derivatives of STFT and Wignerville Transform.

Continuing with reference to FIG. 2, the spectral feature extracting engine 100 slices (215) the time-frequency spectrum across time into time-frequency slices. Each of the time-frequency slices has spectral content representing a measure of power spectral density of the bias-free signal at a given point in time. The significance of slicing the T-F spectrum into time slices is that in enables a statistical filter (or process executed by a statistical filter) to develop and adaptive, time-varying detection threshold that tracks the nature of the signal and noise.

The spectral feature extracting engine 100 computes (220) a threshold, called an initial detection threshold, associated with the given signal from the time-frequency slices. In some examples, to compute the threshold, the spectral feature extracting engine 100 computes the log, log-power magnitude, or combinations thereof, of the spectral content that corresponds to the time-frequency slices. As such, the spectral feature extracting engine 100 can, advantageously, processes various representations of a spectral content of a signal, some of which may be more convenient to being communicated, processed, and/or stored. The spectral feature extracting engine 100 then computes any order moment or derivatives thereof.

In a convenient example, the spectral feature extracting engine 100 computes (220) an initial detection threshold according to the following series of equations.

A signal F consist of N frequency samples extracted from time slice i. As an optional optimization step, the first M samples from the beginning and end of a buffer of the spectral feature extracting engine 100. For example, for a 512 point FFT length (samples), M=20.

$$\mathcal{F}(f) = \mathcal{F}(M:N-M) \text{ for } N=512, M=20 \quad (1)$$

The spectral feature extracting engine 100 computes the logarithm $$\mathcal{F}(f) = 10*\log_{10}|\mathcal{F}(M:N-M)| \quad (2)$$

The spectral feature extracting engine 100 computes the mean $\mu_F(i)$ and the standard deviation $\sigma_F(i)$ for time slice i $$\mu_F(i) = \frac{1}{N-2M} \sum_l \mathcal{F}(l) \quad (3)$$

$$\sigma_F(i) = \sqrt{\frac{1}{N-2M} \left( \sum_l \mathcal{F}(l) - \mu_F(i) \right)^2} \quad (4)$$

The mean and variance establish a "crossing" threshold $\gamma(i)$ for time slice i $$\gamma(i) = \sigma_F(i) + \mu_F(i) \quad (5)$$

Continuing with reference to FIG. 2, for at least some (or for each) of the time-frequency slices, the spectral feature extracting engine 100 compares (225) the spectral content of a subject time-frequency slice with the computed initial detection threshold to identify an initial detection or "crossing." The identified initial detection is then used to determine a metric called a detection density (describe below in greater detail). In some examples, the spectral feature extracting engine 100 identifies an initial detection when the spectral content of the subject time-frequency slice exceeds the threshold by a certain amount A. In other examples, a threshold value and/or the amount λ may be provided by a user, or the threshold value and/or the amount λ may be predetermined, e.g., based on a desired detection sensitivity. In a convenient example, the spectral feature extracting engine 100 computes a total number of crossing that exceeds a threshold by a certain amount λ according to the following equation:

$$D = \Sigma_{(i,j)} 1_{|\mathcal{F}_j(i)-\gamma(i)| \geq \lambda}(\mathcal{F}_j(i)) \quad (6)$$

in which i is the frequency index and j is the time index across the time-frequency plane.

The spectral feature extracting engine 100, determines (230) a spectral detection density as a function of a number of initial detections being identified and number of time-frequency slices being compared (e.g., the size of a TF region or patch being processed). The spectral detection density is a metric that may be used to detect channel-induced and target-induced chirp(s) present in a signal or to classify a target from a signal (described in greater detail below). In some examples, the spectral feature extracting engine 100 determines (230) the detection density by computing a number of detection per unit area in (Hz*Sec)−1 according to following equation:

$$\rho = \frac{D}{N*NS} \quad (7)$$

where $NS$ = number of time − frequency slices

The chirp detecting engine 105 detects (235) channel-induced and target-induced chirps present in the signal based on the spectral detection density (described in greater detail below). Once detected, the value of the chirps may be estimated and then removed from the signal. Alternatively, the target classifying engine 110 classifies (240) a target from the signal based on the spectral detection density. In some examples, the target classifying engine 110 compares the spectral detection density of a signal with spectral signatures of targets or "training data," which may be predetermined. The spectral signatures may be stored in a classification library, table or other means suitable for storing spectral signatures.

For example, a classification table stores the spectral signatures for targets 1, 2, 3, and 4, which are different from one another. The spectral feature extracting engine 100 determines a spectral detection density for a signal, as described above. The target classifying engine 110 performs a look up in the classification table and matches the spectral detection density of the signal to the spectral signature for target 3. The target classifying engine 110 identifies the signal as being associated with target 3 and not target 1, 2 or 4. As such, the target classifying engine 110 distinguishes targets spectrally. Advantageously, the target classifying engine 110 can identify targets from signals having multiple chirps with multiplicative and additive noise, which may be present in targets having small radar cross-sections.

In a convenient example, the target classifying engine 110 compares how the spectral density of a signal varies over time (i.e., "spectral density rate") with spectral signatures for targets that are time-varying. Advantageously, the target classifying engine 110, by using the spectral density to discriminate targets, exploits a high degree of correlation among spectral targets and their respective behaviors, and enables a signal processing system, such as the signal processing system 115 of FIG. 1, to optimize filtering on a target-by-target basis.

For the target classification task, it is typically insufficient to examine the spectral detection density based on a single threshold value. Spectral feature extraction for this task involves monitoring the time evolution of the detection density and examining it against a predetermined set of thresholds as time evolves. A target is selected by correlating (comparing) the spectral signature at hand against those in a classification library and selecting the target whose signature constitutes the best (closest) match.

Figure 3:
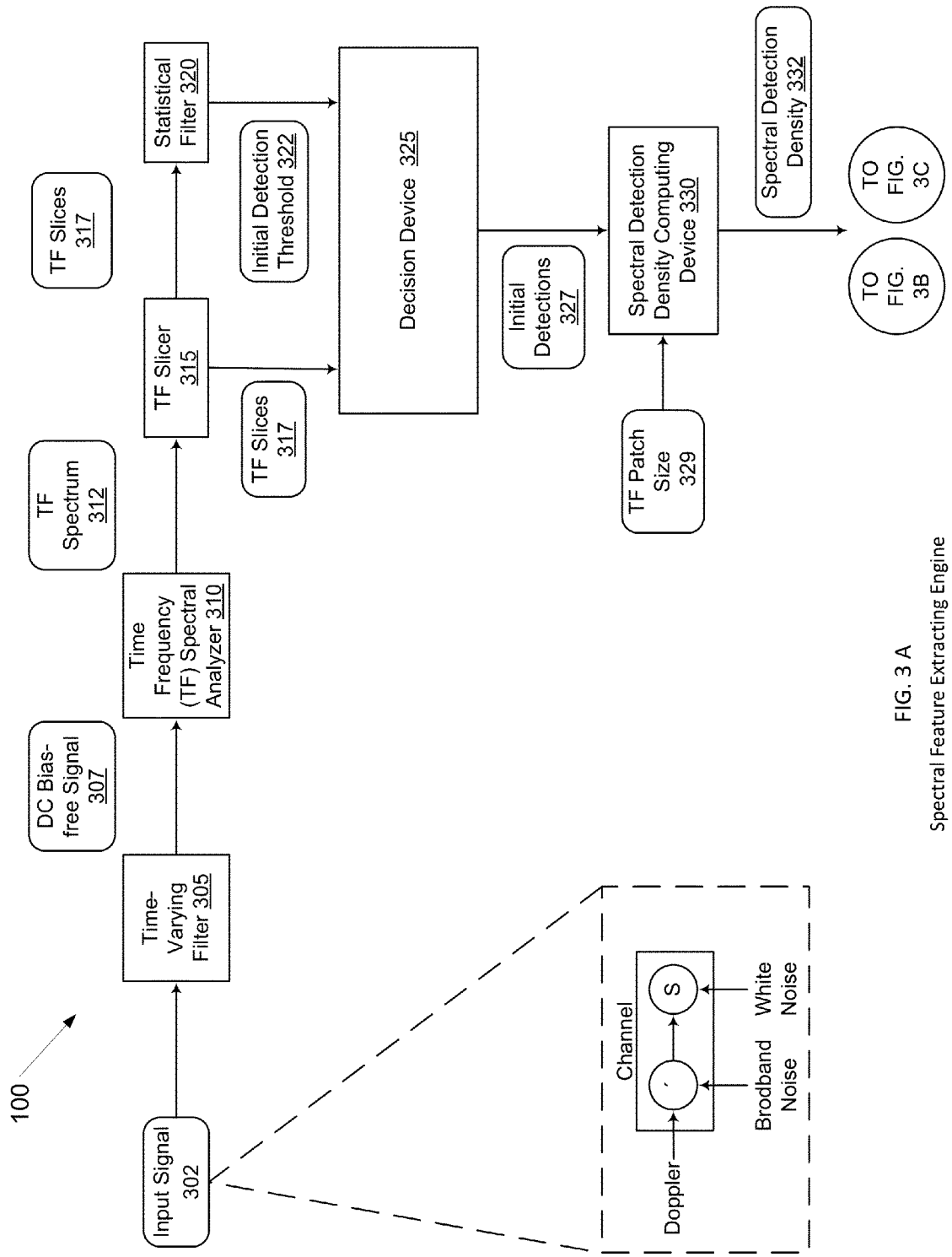
FIG. 3A is a block diagram of an example architecture of a spectral feature extracting engine.
FIG. 3B is a block diagram of an example architecture of a chirp detecting engine.
FIG. 3C is a block diagram of an example architecture of a target classifying engine.

FIG. 3A illustrates an example architecture of the spectral feature extracting engine 100 for extracting one or more spectral features from the signal 102 for use in detecting chirps in the signal 102 or classifying a target from the signal 102. The spectral feature extracting engine 100 may be implemented on a computer system, which may generally include typical computer components such as a processor, a memory, one or more storage devices, and one or more input and output devices, among other things. In one implementation, the spectral feature extracting engine 100 may be maintained in an active memory of the computer system to enhance speed and efficiency, and may further be coupled to a computer network and utilize distributed resources associated with the computer network.

In some examples, as shown in FIG. 3A, the spectral feature extracting engine 100 includes a time varying filter 305, time frequency (TF) spectral analyzer 310, TF slicer 315, statistical filter 320, decision device 325, and spectral detection density computing device 330. In general, the spectral feature extracting engine 100 accepts the signal 302 as input and outputs a spectral detection density 332 associated with the input signal 302.

In some examples, the time varying filter 305 is configured to remove direct current (DC) bias from the signal 102 to produce a substantially bias-free signal 307. As shown in FIG. 3A, the signal 102 (in this example, a Doppler return signal) includes broadband noise and white noise, which are multiplicative and additive. The time frequency (TF) spectral analyzer 310 transforms the bias-free signal 307 into a time-frequency spectrum 312. The TF slicer 315 slices the time-frequency spectrum across time into time-frequency slices 317. Each of the time-frequency slices 317 has spectral content representing a measure of power spectral density of the bias-free signal at a given point in time. From the time-frequency slices 317, the statistical filter 320 computes an initial detection threshold 322. The decision device 325 compares the spectral content of a subject time-frequency slice 317 with the computed initial detection threshold 322 to identify an initial detection (or "crossing") 327. The spectral detection density computing device 330 calculates the spectral detection density 332 as a function of a number of initial detections 327 being identified and number of time-frequency slices being compared (e.g., TF patch size) 329. The calculated spectral detection density is a metric that may be used to detect channel-induced and target-induced chirp(s) present in a signal or to classify a target from a signal, as described above in reference to FIG. 2.

In other examples, the spectral feature extracting engine 100 includes an interface (not shown) configured to receive data corresponding to one or more signals, TF patch size 329, amount $\lambda$ by which the spectral content of the subject time-frequency slice 317 must exceed in order for the decision device 325 to identify the initial detection 327, among other information relating to the processing of signals. In a convenient example, the interface may be arranged to receive information directly from a user (or operator) via an input device (described below in greater detail) associated with spectral feature extracting engine 100 (or signal processing system 115 of FIG. 1), or directly from a component coupled to the spectral feature extracting engine 100, such as memory (described below in greater detail).

Figure 3B:
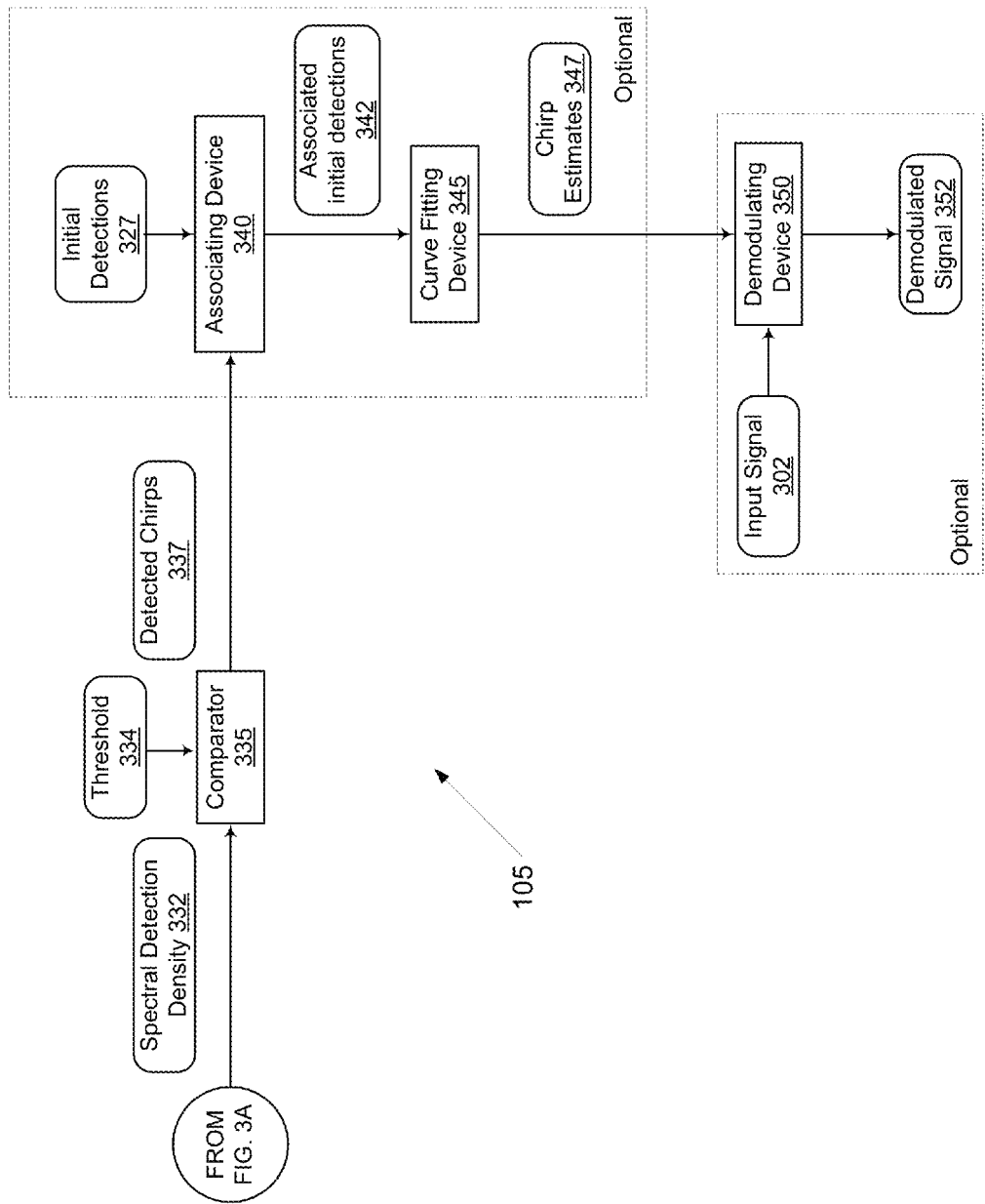

In some examples, as shown in FIG. 3B, the chirp detecting engine 105 includes a comparator 335, associating device 340, curve fitting device 345, and demodulating device 346. In other examples, the chirp detecting engine 105 includes the comparator 335, associating device 340, and curve fitting device 345 without demodulating device 346. In still other examples, the chirp detecting engine 105 includes the comparator 335 without the associating device 340, curve fitting device 345, and demodulating device 346.

In some examples, the comparator 335 compares the spectral detection density 332 to threshold 334 to identify detected chirp(s) 337 in the input signal 102. In a convenient example, the comparator 335 identifies detected chirp(s) 337 when the spectral detection density 332 exceeds the threshold 334. In another example, the comparator 335 identifies detected chirp(s) 337 when the spectral detection density 332 exceeds the threshold 334 by a fixed amount (e.g., the amount $\lambda$) which in some instances may be provided by a user or defined by an application.

Optionally, in some examples, given one or more detected chirps 337 (or indications of detected chirp), the associating device 340 associates initial detections 327 occurring over a given span of time together. The curve fitting device 345 then curve fits the associated initial detections 342 to determine one or more chirp estimates 347. In these examples, the chirp detecting engine 105, in addition to detecting chirps, also performs the operation of estimating the values of detected chirps. The chirp estimates may then be used in any number of applications, such as demodulating one or more detected chirps from a signal as described immediately below.

In some examples, given one or more chirps 337 detected based on the spectral detection density of the given signal 102 and given one or more chirp estimates 347, the demodulating engine demodulates the one or more detected chirps 337 from the given signal 102 using the chirp estimates 357 resulting in a demodulated signal 352. In these examples, the chirp detecting engine 105, in addition to detecting chirps, also performs the operations of estimating the values of detected chirps and demodulating the detected chirps from a signal.

Figure 3C:
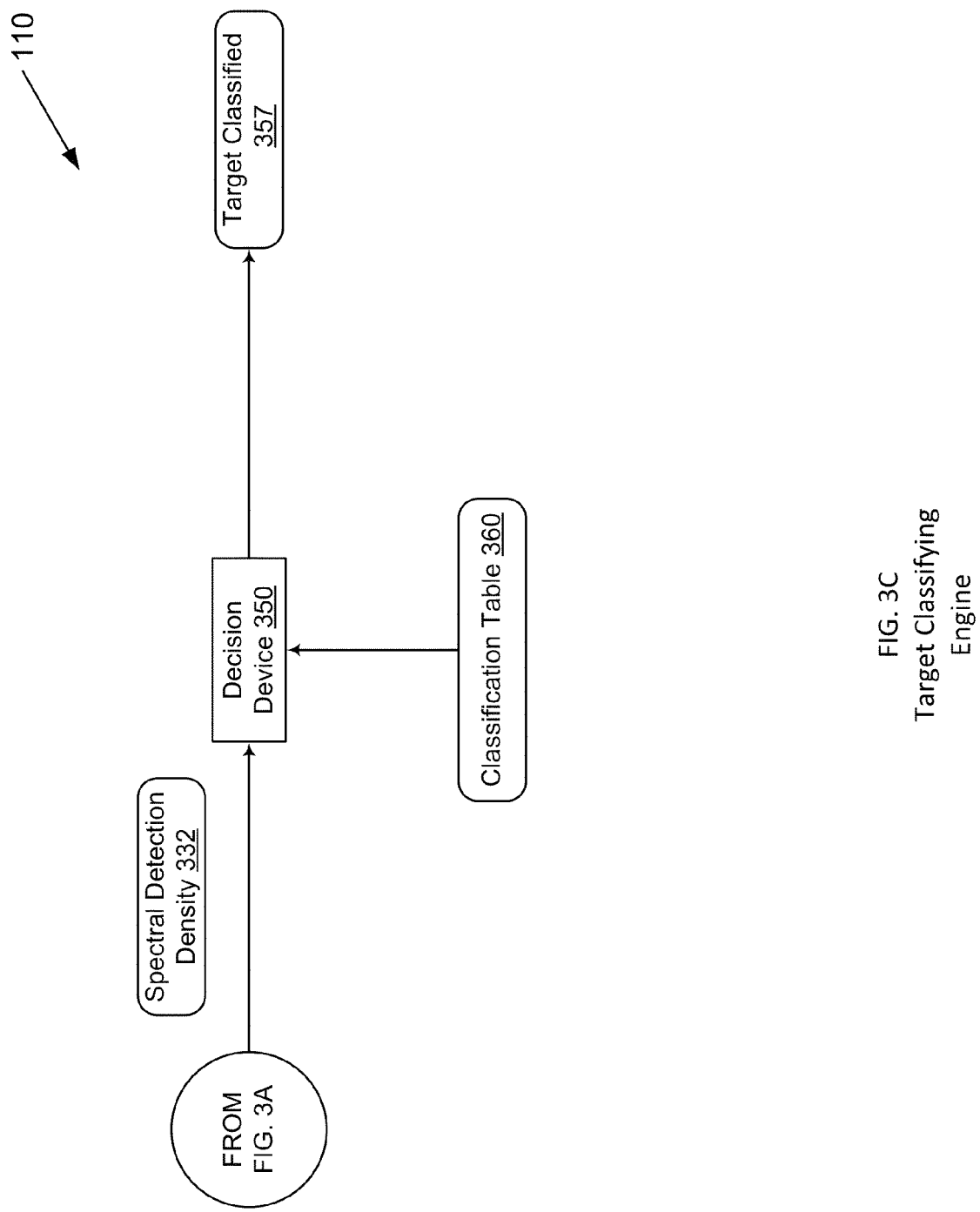

In some examples, as shown in FIG. 3C, the target classifying engine 110 includes a decision device 350 communicatively coupled to a classification table 360. In other examples, the classification table 360 is separate from the target classifying engine 110 and accessed by the decision device 350. The classification table 360 stores the spectral signatures of targets. The decision device 350 compares the spectral detection density 332 with the stored spectral signatures. When the decision device 350 matches the spectral detection density 332 to a spectral signature, the decision device 350 outputs a target classified 357 or declares a match.

In other examples, as shown in FIG. 3C, the decision device 350 compares how the spectral detection density 332 varies over time with spectral signatures for targets that is time-varying. In these examples, the target classifying engine 110 identifies targets based on how the spectral density of a target changes over time (i.e., spectral density "rate").

According to some examples, FIG. 4 shows a graphical representation of an input signal with chirps, and multiplicative and additive noise, such as the input signal 102 of FIG. 3A. The multiplicative noise manifests itself as bursts that are finite in time but cause broadband interference. The composite chirps manifest themselves as oscillations. FIG. 4. illustrates both types of noise.

Figure 5:
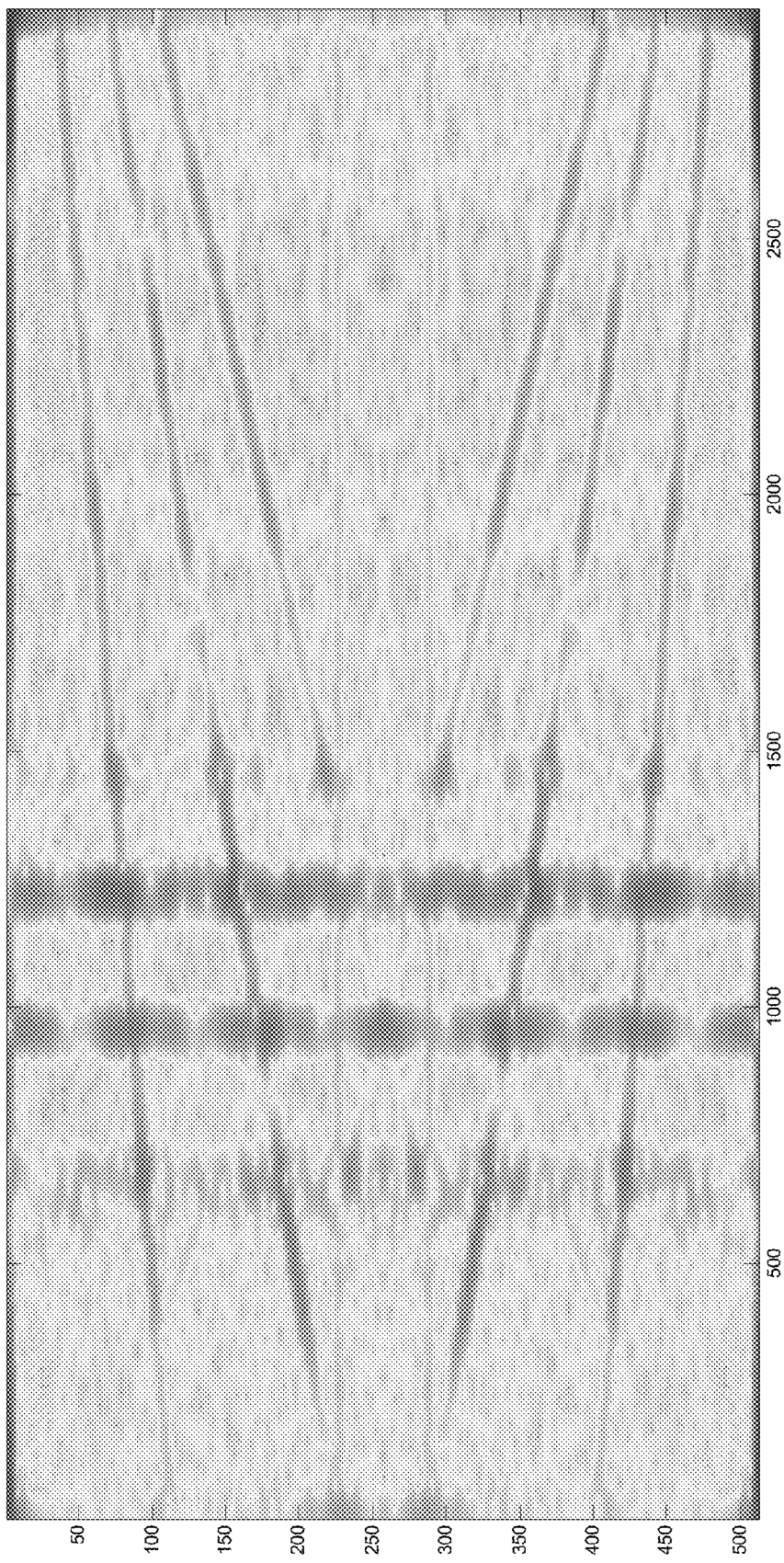

FIG. 5 shows a graphical representation of a time-frequency spectrum with chirps, and multiplicative and additive noise, such as the time-frequency spectrum 312 of FIG. 3A. The chirps are the straight lines that span the time-frequency spectrum at a constant slope. The value of the chirp is given by the slope of the straight line. The multiplicative noise manifests itself as vertical streaks of energy that fill the entire spectrum and last for a short period of time.

Figure 6:
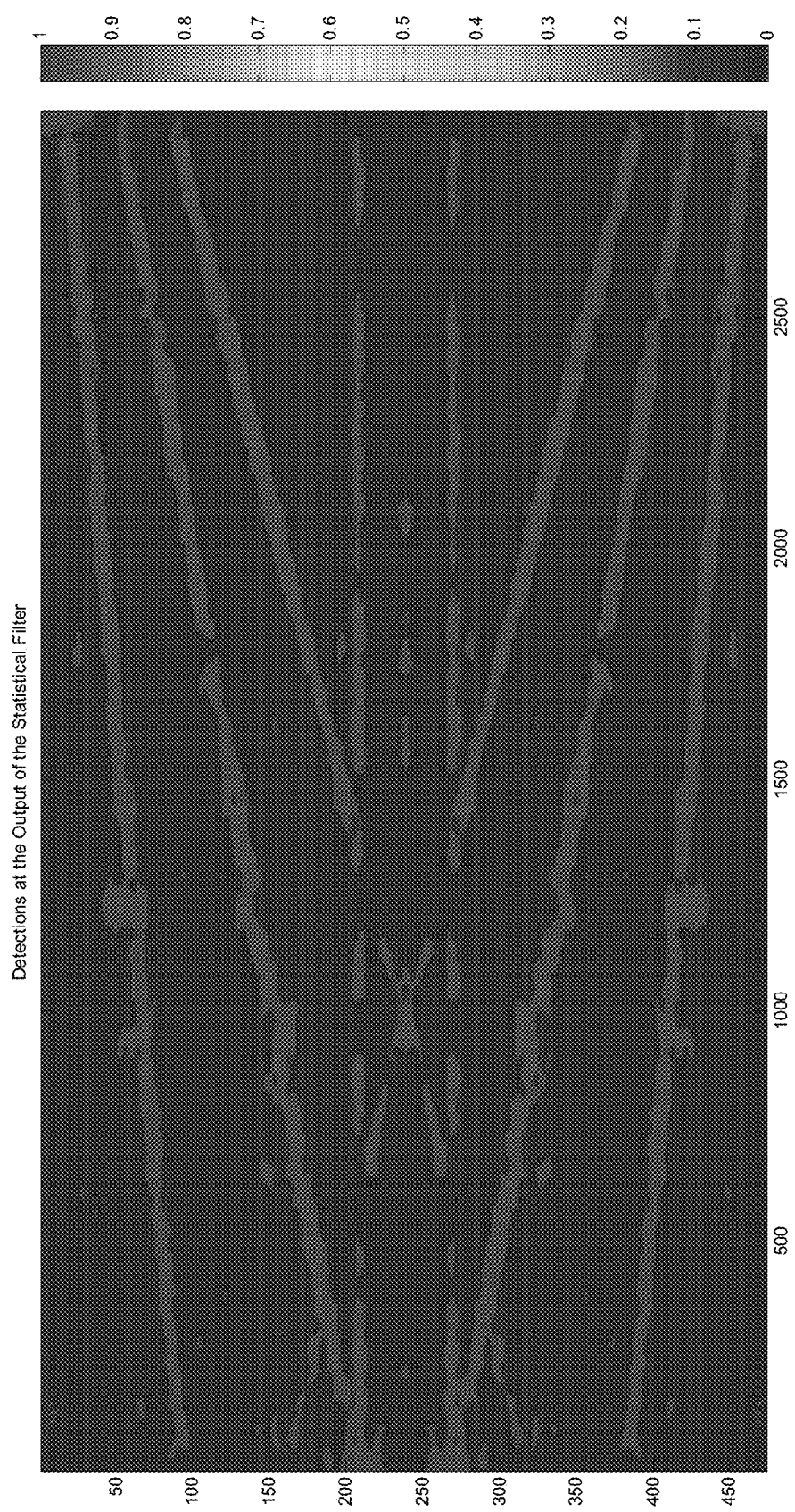

FIG. 6 shows a graphical representation of spectral content used in calculating an initial detection threshold, such as the initial detection threshold 322 of FIG. 3A. The content of FIG. 6 shows the spectrum after it has been processed by the statistical filter. FIG. 6 clearly illustrates the ability of the statistical filter to remove the broadband noise leaving only the chirps with some undesirable spectral features. FIG. 6 illustrates only the location of the detections but not the actual energy content.

Figure 7:
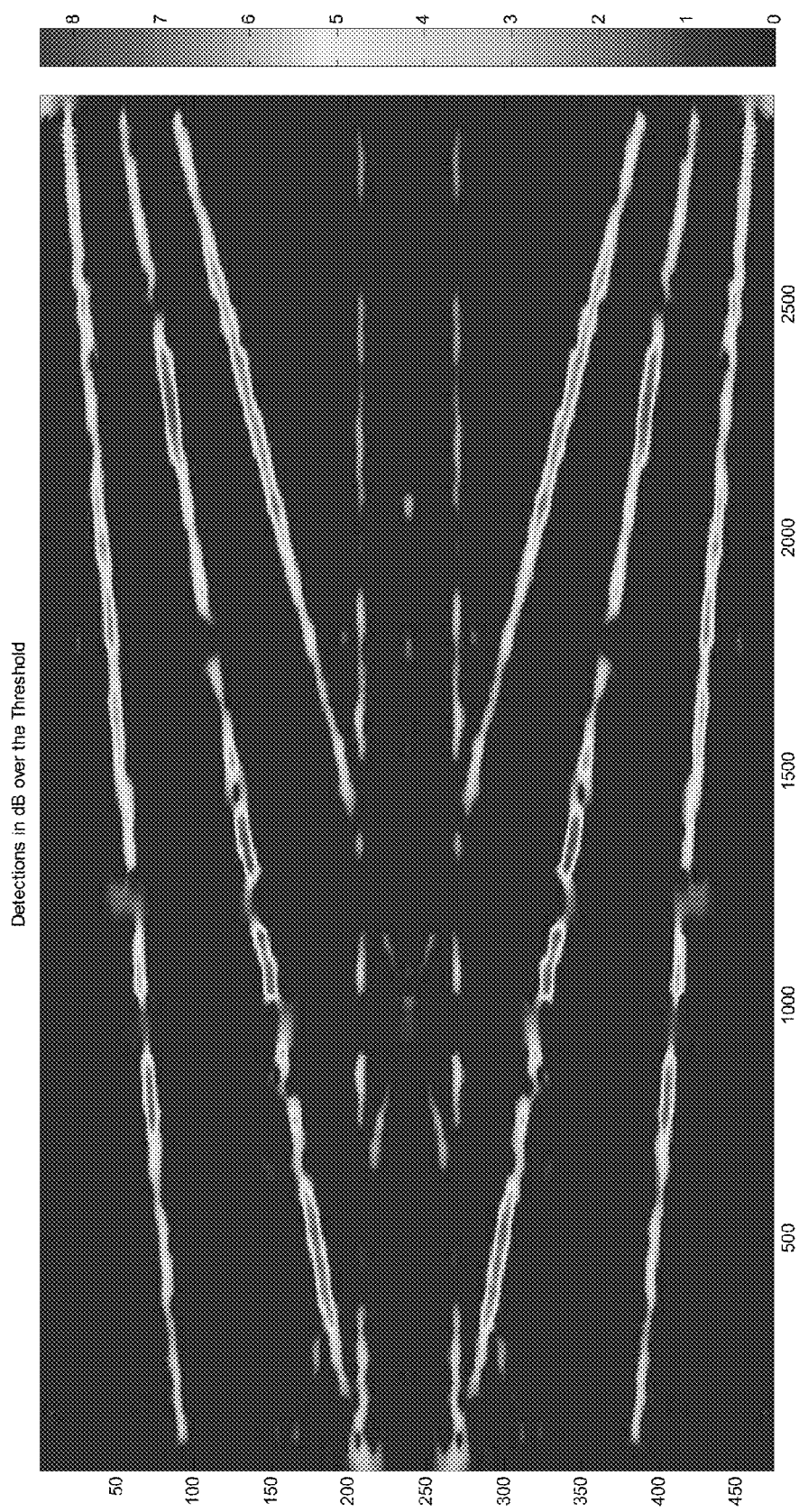
Figure 8:
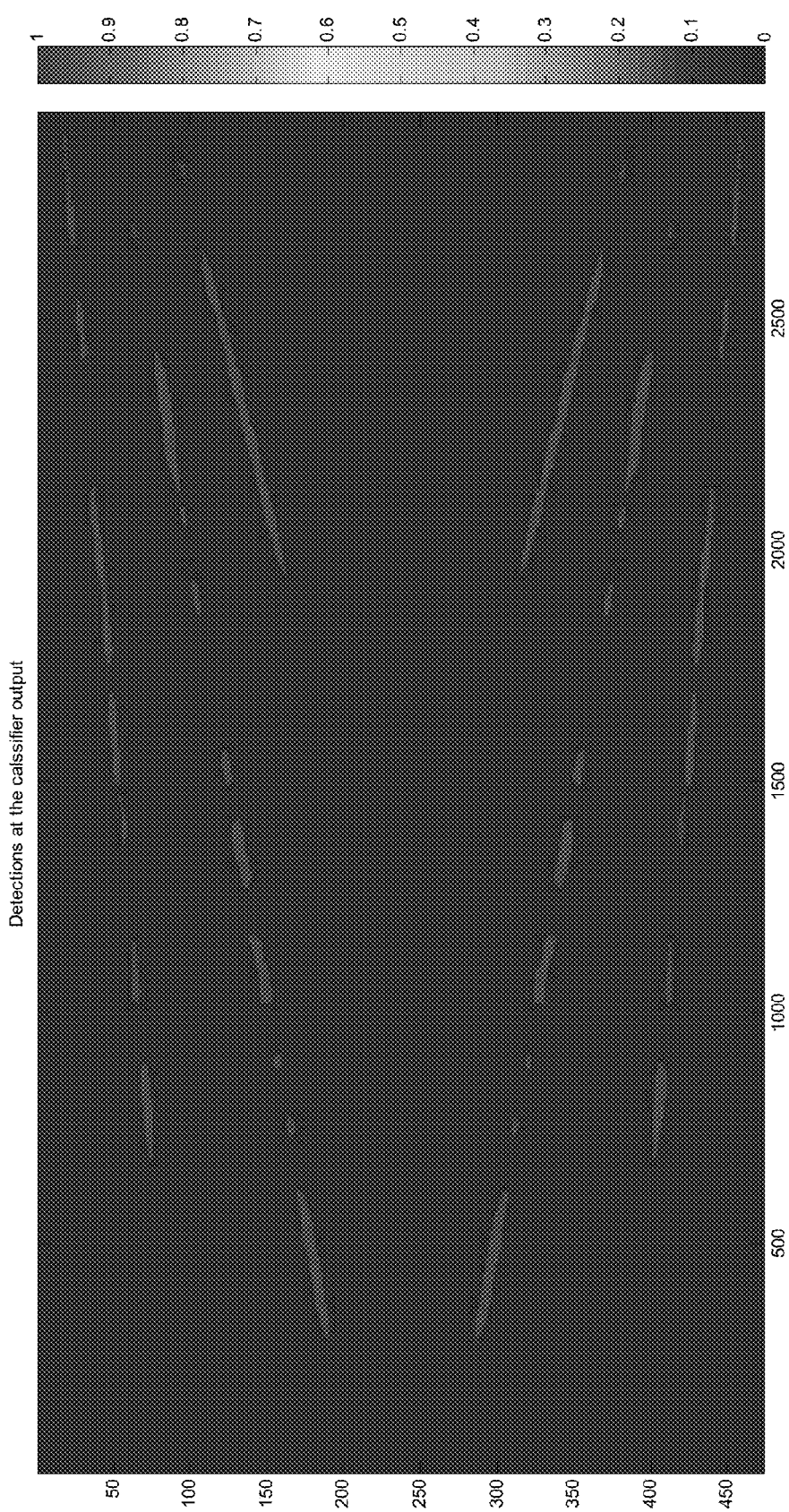

FIG. 7 shows a graphical representation of the energy in dB of the time-frequency spots that pass the initial detection(s) (e.g., the initial detection(s) 327 of FIG. 3A). FIG. 8 shows a graphical representation of the time-frequency spots that exceed detection threshold by a desirable amount, such as the detected chirps 337 of FIG. 3B.

Figure 9:
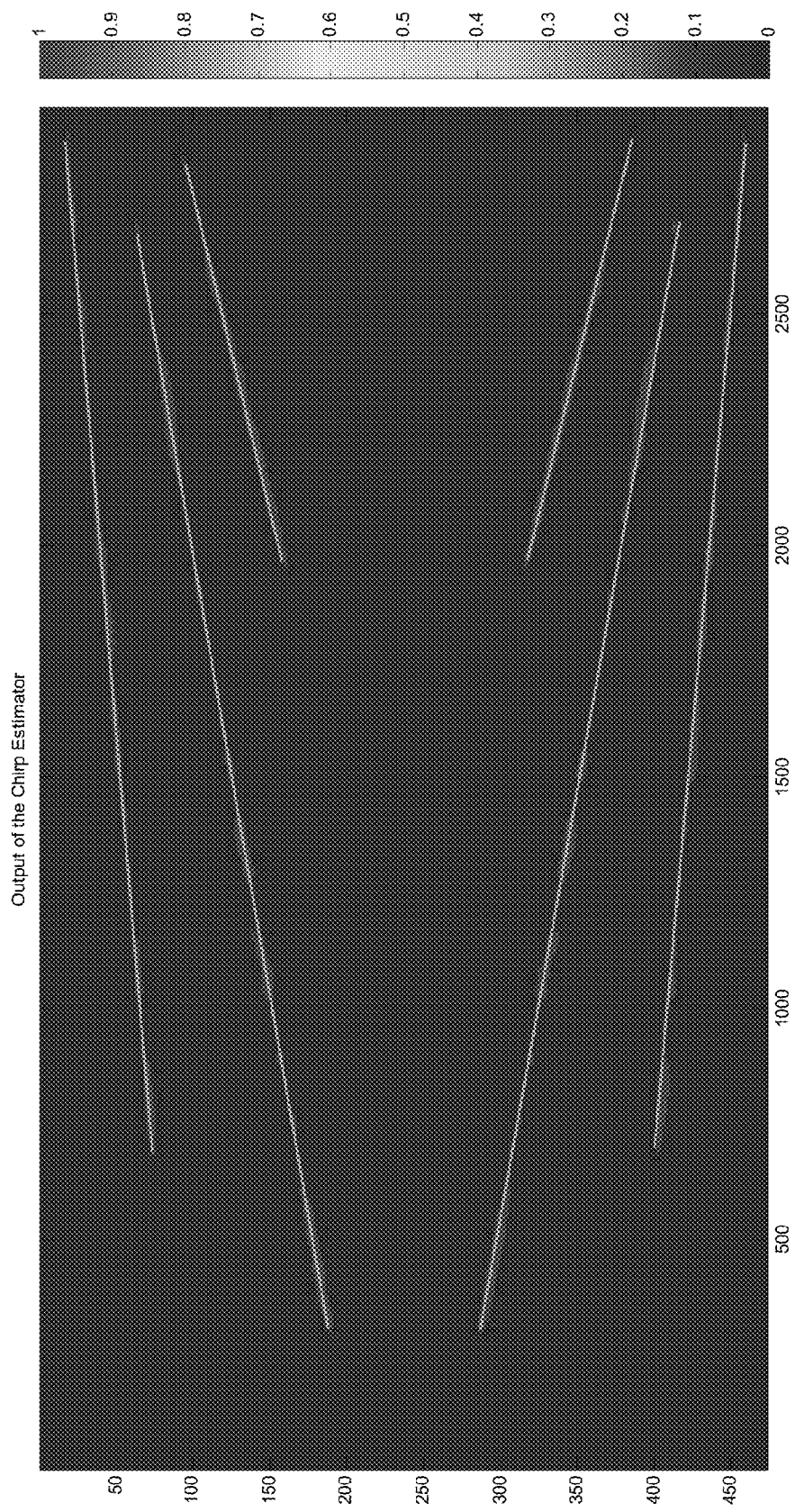

FIG. 9 shows a graphical representation of the chirp estimates 347 at the output of the curve fitting device 345 in FIG. 3B. The chirp estimates can be fed to a demodulating device 350, as in FIG. 3B, to provide a chirp free signal.

The above-described examples of the spectral feature extracting engine 100, chirp detecting engine 105, and target classifying engine 110, and corresponding methods and system can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing examples are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An improved method of operating a RADAR or wireless communications signal processing apparatus implemented as either one or more programmable processors or as special purpose logic circuitry for detecting channel-induced and target-induced chirps in a signal or for classifying a target from a signal using spectral feature extraction, the method comprising:
    operating a spectral feature extracting engine of the apparatus to:
        remove direct current bias from a RADAR or wireless communication signal captured by a receiver, the signal having impairments including multiplicative and additive noise, in order to produce a bias-free signal;
        transform the bias-free signal into a time-frequency spectrum;
        slice the time-frequency spectrum across time into time-frequency slices, each of the time-frequency slices having spectral content representing a measure of power spectral density of the bias-free signal at a given point in time;
        compute an initial detection threshold associated with the given signal from the time-frequency slices;
        compare, for at least some of the time-frequency slices the spectral content of a subject time-frequency slice with the computed initial detection threshold to identify an initial detection;
        determine a spectral detection density as a function of a number of initial detections being identified and number of time-frequency slices being compared; and
    operating a chirp detecting engine of the apparatus to detect channel-induced and target-induced chirp(s) present in the given signal based on the determined spectral detection density or, a target classifying engine of the apparatus to classify a target from the given signal based on the determined spectral detection density, thereby improving an ability to detect the channel-induced and target-induced chirps in the RADAR or the wireless communication signal impaired with multiplicative and additive noise.

2. The method of claim 1 wherein transforming the bias-free signal includes using any one of Short-Time Fourier Transform, and Wignerville Transform, to transform the given signal.

3. The method of claim 1 wherein computing the initial detection threshold includes computing any order moment of the spectral content of the time-frequency slices measured in power, log-power, magnitude, or combinations thereof.

4. The method of claim 1 wherein comparing includes identifying the initial detection when the spectral content of the subject time-frequency slice exceeds the computed initial detection threshold.

5. The method of claim 1 wherein determining the spectral detection density includes scaling the number of initial detections being identified by a time-bandwidth product of a given number of time-frequency slices.

6. The method of claim 1 wherein detecting channel-induced and target-induced chirp(s) includes comparing the spectral detection density to a threshold indicative of one or more chirps being present in the given signal.

7. The method of claim 1 wherein classifying the target includes comparing the determined spectral detection density with spectral signatures obtained from training data.

8. The method of claim 7 wherein classifying the target includes comparing the determined spectral detection density over time with the spectral signatures.

9. The method of claim 1 further comprising:
    given one or more chirps detected based on the spectral detection density of the given signal, associating initial detections occurring over a given span of time together; and
    curve fitting the associated initial detections to determine one or more chirp estimates.

10. The method of claim 9 further comprising demodulating the one or more detected chirps from the given signal using the chirp estimates.

11. A RADAR or wireless communications signal processing apparatus for detecting channel-induced and target-induced chirps in a signal or for classifying a target from a signal using spectral feature extraction, the apparatus comprising:

a hardware memory having computer executable instructions stored thereupon; and one or more programmable processors or special purpose logic circuitry communicatively coupled to the hardware memory and configured to execute the instructions to:

remove direct current bias from a RADAR or wireless communication signal captured by a receiver, the signal having impairments including multiplicative and additive noise, in order to produce a bias-free signal;

transform the bias-free signal into a time-frequency spectrum;

slice the time-frequency spectrum across time into time-frequency slices, each of the time-frequency slices having spectral content representing a measure of power spectral density of the bias-free signal at a given point in time;

compute an initial detection threshold associated with the given signal from the time-frequency slices;

compare, for at least some of the time-frequency slices; the spectral content of a subject time-frequency slice with the computed initial detection threshold to identify an initial detection;

determine a spectral detection density as a function of a number of initial detections being identified and number of time-frequency slices being compared; and either detect channel-induced and target-induced chirp(s) present in the given signal based on the determined spectral detection density, or classify a target from the given signal based on the determined spectral detection density, thereby improving an ability to detect the channel-induced and target-induced chirps in the RADAR or the wireless communication signal impaired with multiplicative and additive noise.

12. A non-transitory computer-readable storage medium encoded with instructions that when executed by one ore more programmable processors of a RADAR or wireless communications signal processing apparatus cause the apparatus to:

remove direct current bias from a RADAR or wireless communication signal captured by a receiver, the signal having impairments including multiplicative and additive noise, in order to produce a bias-free signal;

transform the bias-free signal into a time-frequency spectrum;

slice the time-frequency spectrum across time into time-frequency slices, each of the time-frequency slices having spectral content representing a measure of power spectral density of the bias-free signal at a given point in time;

compute an initial detection threshold associated with the given signal from the time-frequency slices;

compare, for at least some of the time-frequency slices, the spectral content of a subject time-frequency slice with the computed initial detection threshold to identify an initial detection;

determine a spectral detection density as a function of a number of initial detections being identified and number of time-frequency slices being compared; and either detect channel-induced and target-induced chirp(s) present in the given signal based on the determined spectral detection density, or classify a target from the given signal based on the determined spectral detection density, thereby improving an ability to detect the channel-induced and target-induced chirps in the RADAR or the wireless communication signal impaired with multiplicative and additive noise.

* * * * *